United States Patent
Zhou et al.

(10) Patent No.: US 9,007,965 B2
(45) Date of Patent: Apr. 14, 2015

(54) PRE-CODING/PRE-DECODING METHOD AND APPARATUS FOR DATA TRANSMISSION IN MOBILE COMMUNICATION SYSTEM

(75) Inventors: Lei Zhou, Beijing (CN); Xufeng Zheng, Beijing (CN); Zheng Zhao, Beijing (CN)

(73) Assignees: Samsung Electronics Co. Ltd., Suwon-si (KR); Beijing Samsung Telecom R&D Center, Beijing (CN)

( * ) Notice: Subject to any disclaimer, the term of this patent is extended or adjusted under 35 U.S.C. 154(b) by 1003 days.

(21) Appl. No.: 12/749,940

(22) Filed: Mar. 30, 2010

(65) Prior Publication Data
US 2010/0246457 A1 Sep. 30, 2010

(30) Foreign Application Priority Data
Mar. 30, 2009 (CN) .......................... 2009 1 0130264

(51) Int. Cl.
| | |
|---|---|
| H04L 5/14 | (2006.01) |
| H04B 17/00 | (2006.01) |
| H04L 12/16 | (2006.01) |
| H04B 7/04 | (2006.01) |
| H04L 25/02 | (2006.01) |
| H04B 7/06 | (2006.01) |

(52) U.S. Cl.
CPC .......... *H04B 7/0434* (2013.01); *H04B 17/0062* (2013.01); *H04L 25/0232* (2013.01); *H04L 25/0246* (2013.01); *H04L 25/0248* (2013.01); *H04B 7/0632* (2013.01); *H04B 7/0639* (2013.01)

(58) Field of Classification Search
CPC ............ H04B 7/0434; H04B 17/0062; H04B 7/0632; H04B 7/0639; H04L 25/0248; H04L 25/0232; H04L 25/0246
USPC ....................................................... 370/294
See application file for complete search history.

(56) References Cited

U.S. PATENT DOCUMENTS

| | | | | |
|---|---|---|---|---|
| 2006/0034165 | A1* | 2/2006 | Levy | 370/208 |
| 2006/0234645 | A1* | 10/2006 | Lin et al. | 455/69 |
| 2007/0064830 | A1* | 3/2007 | Choi et al. | 375/267 |
| 2009/0052357 | A1* | 2/2009 | Suo et al. | 370/280 |
| 2009/0196164 | A1* | 8/2009 | Vook et al. | 370/208 |
| 2011/0255625 | A1* | 10/2011 | Song et al. | 375/267 |

* cited by examiner

*Primary Examiner* — Luat Phung
(74) *Attorney, Agent, or Firm* — Jefferson IP Law, LLP (57) ABSTRACT

A pre-coding/decoding method and apparatus for data transmission between a transmitting end and a receiving end is provided. The pre-coding method for data transmission through Time Division Duplexing (TDD) in a mobile communication system includes estimating downlink channel state information based on an uplink sounding signal, and pre-coding a data symbol and a reference signal based on the estimated downlink channel state information.

29 Claims, 5 Drawing Sheets

PRE-CODING/PRE-DECODING METHOD AND APPARATUS FOR DATA TRANSMISSION IN MOBILE COMMUNICATION SYSTEM

PRIORITY

This application claims the benefit under 35 U.S.C. §119(a) of a Chinese patent application filed on Mar. 30, 2009 in the Chinese Intellectual Property Office and assigned Serial No. 200910130264.8, the entire disclosure of which is hereby incorporated by reference.

BACKGROUND OF THE INVENTION

1. Field of the Invention

The present invention relates to data transmission technology. More particularly, the present invention relates to a pre-coding/decoding method and apparatus for data transmission between a transmitting end and a receiving end.

2. Description of Prior Art

Radio services are now of increasing importance, and accompanied by a growing demand for higher network capacities and performances. The conventional technical solutions, such as bandwidth augmentation, modulation optimization, and even code reuse, have limited potential for improving spectrum utilization efficiency. MIMO (Multiple Input Multiple Output) systems adopt antenna arrays and space reuse technology to improve bandwidth utilization efficiency. In many practical applications, channel parameters are obtained via a feedback channel from the receiving end to the transmitting end (assuming the feedback delay is far less than the channel coherence time).

In the TDD (Time Division Duplex) system, the estimated values for a channel in the receiving mode can be used in the transmitting mode if the space between data receiving and transmitting is completed in the ping-pong time, (assuming the ping-pong time is far less than the channel coherence time). This leads to a question: how to use these channel estimates to optimize transmission solutions for transmitters and to design optimal receivers accordingly. Currently, the research is mainly on linear and nonlinear optimized pre-coding techniques.

The nonlinear pre-coding scheme offers a better performance, but is far more complicated than the linear scheme. Linear pre-coding technology is thus becoming the focus of research. Linear pre-coding technology makes full use of part or all of Channel State Information (CSI) to obtain as much beam forming gain as possible. Singular Value Decomposition (SVD) is the most commonly used method in the linear pre-coding technology. In theory, SVD-based linear pre-coding technology can achieve a transmission rate reaching the limit of channel capacity. SVD-based linear pre-coding technology requires that the transmitting end knows as much CSI as possible, and the basic principle is discussed below.

Consider an MIMO system with $N_t$ transmitting antennas and $N_r$ receiving antennas in a flat fading channel. Let x be a complex vector of data symbols, H be a $N_r \times N_t$ channel matrix which complies with Rayleigh distribution, and n be Additive White Gaussian Noise (AWGN). The vector y of the received symbols at the receiving end is:

$$y = Hx + n \qquad (1)$$

where H represents a channel matrix, x represents a transmission signal, and n represents AWGN.

SVD is used to decompose the channel matrix H into 3 matrixes, $SVD\{H\}=\{U,\Sigma,V\}$, where U and V are unitary matrixes, and $\Sigma$ represents a singular value diagonal matrix of the channel matrix H arranged in a descending order. The SVD expression of the channel matrix H is:

$$H = U\Sigma V^* \qquad (2)$$

where U represents a unitary matrix including a left eigenvector of a channel matrix H, V represents a unitary matrix including a right eigenvector of the channel matrix H, and '*' represents a conjugate transpose operator.

Figure 1:
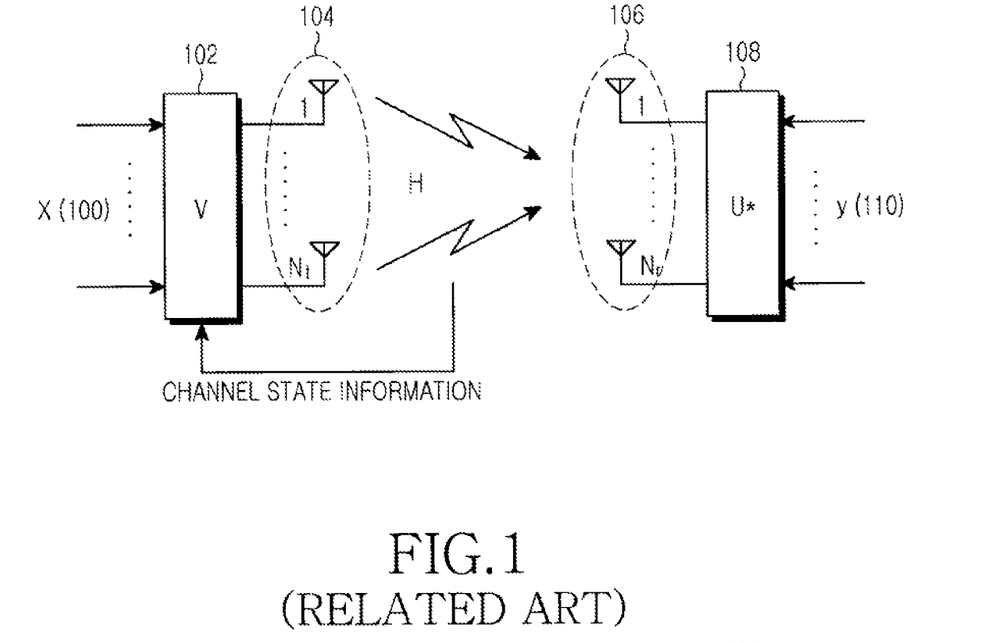
FIG. 1 shows a block diagram of a SVD-based MIMO system according to the related art.

FIG. 1 illustrates a block diagram of the SVD-based MIMO according to the related art.

Referring to FIG. 1, the data symbol vector x 100, after being multiplied by the pre-coding matrix V 102 at the transmitting end, is sent out through $N_t$ antennas 104. The data signals arrive at the receiving end via MIMO channels. The receiving end uses $N_r$ antennas 106 to receive the signals and uses the pre-decoding matrix U* to remove any influence from the channels. The received vector y 110 can be expressed as:

$$\begin{aligned} y &= U*HVx + U*n \\ &= U*U\Sigma V*Vx + U*n \\ &= \Sigma x + U*n \end{aligned} \qquad (3)$$

where U represents a unitary matrix including a left eigenvector of a channel matrix H, V represents a unitary matrix including a right eigenvector of the channel matrix H, x represents a vector of a transmitting signal, n represents AWGN, and '*' represents a conjugate transpose operator.

Figure 3:
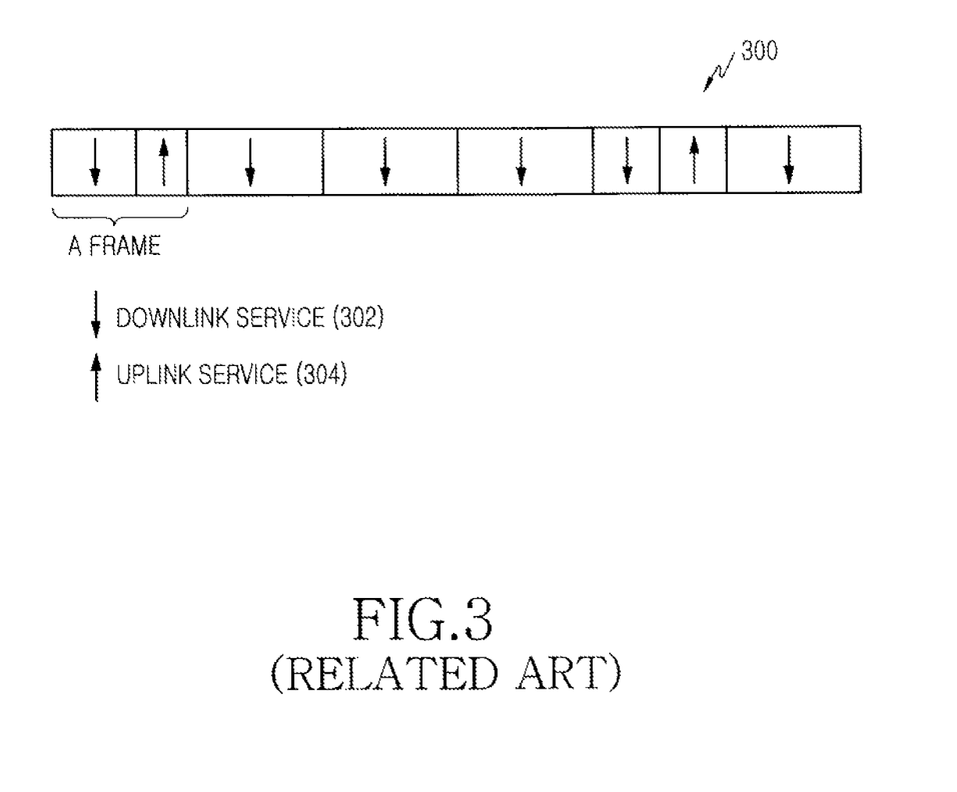
FIG. 3 shows a frame structure for multiple switchovers of asymmetrical services according to the related art.

If the transmitting end has an already known CSI, the transmitting end can use matrix algorithm to pre-code the signals to be transmitted. This can simplify receiver performance. In the TDD system, uplink and the downlink share the same frequency band. According to the reciprocal principle of uplink and downlink channels, the transmitting end can therefore use a preamble in the uplink or Uplink Sounding (UL Sounding) to estimate the CSI in the downlink. Unfortunately, because delays due to necessary processing have to be considered, the channel estimate of the uplink cannot be directly applied to the downlink. Moreover, the number of slots in the uplink may be less than those in the downlink. This is due to asymmetrical services resulting from such multimedia services as data streaming services, data download services, FTP, P2P, online video and digital broadcasting, as shown in FIG. 3. Therefore, deterioration in system performance may be caused if the transmitting end or the base station uses outdated uplink channel estimates in pre-coding.

In the TDD mode of the existing Institute of Electrical and Electronics Engineers (IEEE) 802.16e Standard or the IEEE 802.16m Standard under research, there is still a problem of uplink and downlink service asymmetry between the base station and the mobile user due to multimedia services.

Figure 2:
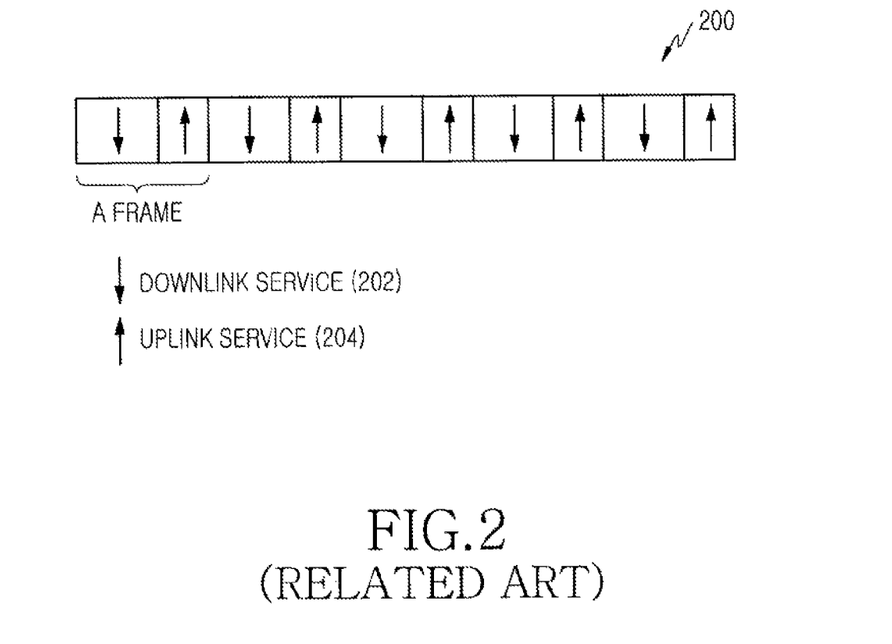
FIG. 2 shows a frame structure for multiple switchovers of symmetrical services according to the related art.

FIG. 2 shows a frame structure 200 of several switchovers of symmetrical services according to the related art, where downlink services 202 are denoted by the sign "↓", and uplink services 204 are denoted by the sign "↑".

Referring to FIG. 2, the whole burst service is divided into several frames, each frame containing several slots. Each frame is divided between downlink data services and uplink data services. Assuming that in one frame the channel experiences a slow change procedure, the transmitting end can follow the reciprocal principle of between uplink and downlink channels and use a pilot, a preamble or UL Sounding in the uplink to estimate the CSI of the downlink.

FIG. 3 shows a frame structure 300 of several switchovers of asymmetrical services according to the related art.

Referring to FIG. 3, there will be more downlink services 302 than uplink services 304 when a mobile terminal requires multimedia services. This results in asymmetry between the uplink and the downlink, with delays between them. The downlink CSI will differ from the CSI estimated using uplink signals such as pilot or UL Sounding signal. If the transmitting end or the base station uses outdated uplink CSI in pre-coding, it will cause inaccuracy in pre-coding and reduce system performance.

A non-patent document by Antti Tölli, Marian Codreanu, and Markku Juntti (Compensation of Non-Reciprocal Interference in Adaptive MIMO-OFDM Cellular Systems, IEEE Transactions on Wireless Communications, Vol. 6, No. 2, pp. 545-555, February 2007) proposes a method which mainly uses the feedback from the receiving end to compensate for the difference between the estimated channel value of the uplink and the actual channel value of the downlink. However, the shortcoming of the above method is that, in the TDD system, system resources for uplink should be occupied to compensate for the difference between the estimated channel value of the uplink and the actual channel value of the downlink. Given the shortage of channel resource in uplink and the increased complexity at the receiving end, it is not feasible to use this method in practical applications.

Therefore, there is a need for a method in which the difference between the estimated channel value of the uplink and the actual channel value of the downlink can be compensated by using downlink channel resource (such as DL Sounding signal) in the TDD mode, especially in asymmetrical service channels. Such a method can downlink channel resource to optimize channel estimation and SVD pre-coding at the transmitting end. This can reduce occupation of uplink channel resource, and thus not cause increased complexity at the receiving end. Such a method can also improve the pre-coding performance of the transmitting end and the pre-decoding accuracy of the receiving end, and can expand the bandwidth utilization efficiency of the system as much as achieving the channel capacity.

SUMMARY OF THE INVENTION

An aspect of the present invention is to address at least the above-mentioned problems and/or disadvantages and to provide at least the advantages described below. Accordingly, an aspect of the present invention is to provide a pre-coding/pre-decoding method and system for data transmission between a transmitting end and a receiving end, which can use downlink channel resource to optimize the pre-coding performance of the transmitting end and the pre-decoding performance of the receiving end.

In accordance with an aspect of the present invention, a pre-coding method for data transmission through Time Division Duplexing (TDD) in a mobile communication system is provided. The method includes estimating downlink channel state information based on an uplink sounding signal, and pre-coding a data symbol and a reference signal based on the estimated downlink channel state information.

In accordance with another aspect of the present invention, a pre-decoding method for data transmission through Time Division Duplexing (TDD) in a mobile communication system is provided. The method includes transmitting an uplink sounding signal on a specific frame, pre-decoding a data symbol included in a next frame of the specific frame, and compensating for a difference between uplink and downlink channels on the pre-decoded data symbol based on a reference signal included in the next frame.

In accordance with a further aspect of the present invention, a pre-coding apparatus for data transmission through Time Division Duplexing (TDD) in a mobile communication system is provided. The apparatus includes a channel estimator for estimating downlink channel state information based on an uplink sounding signal, and a pre-coder for pre-coding a data symbol and a reference signal based on the estimated downlink channel state information.

In accordance with still another aspect of the present invention, a pre-decoding apparatus for data transmission through Time Division Duplexing (TDD) in a mobile communication system is provided. The apparatus includes a transmitter for transmitting an uplink sounding signal on a specific frame, a pre-decoder for pre-decoding a data symbol included in a next frame of the specific frame, and an uplink/downlink channel difference compensator for compensating for a difference between uplink and downlink channels on the pre-decoded data symbol using a reference signal included in the next frame.

Exemplary embodiments of the present invention can use downlink channel resource to optimize channel estimation and pre-coding at the transmitting end, and also enables the receiving end to use the downlink channel resource to compensate for the difference between uplink and downlink channels, which can reduce the occupation of uplink channel resource and improve the overall system performance, without increased complexity at the receiving end.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method and apparatus according to exemplary embodiments of the present invention introduce a DL sounding signal into pre-coding/decoding, and are especially applicable to an asymmetrical service channel environment in TDD mode.

Figure 4:
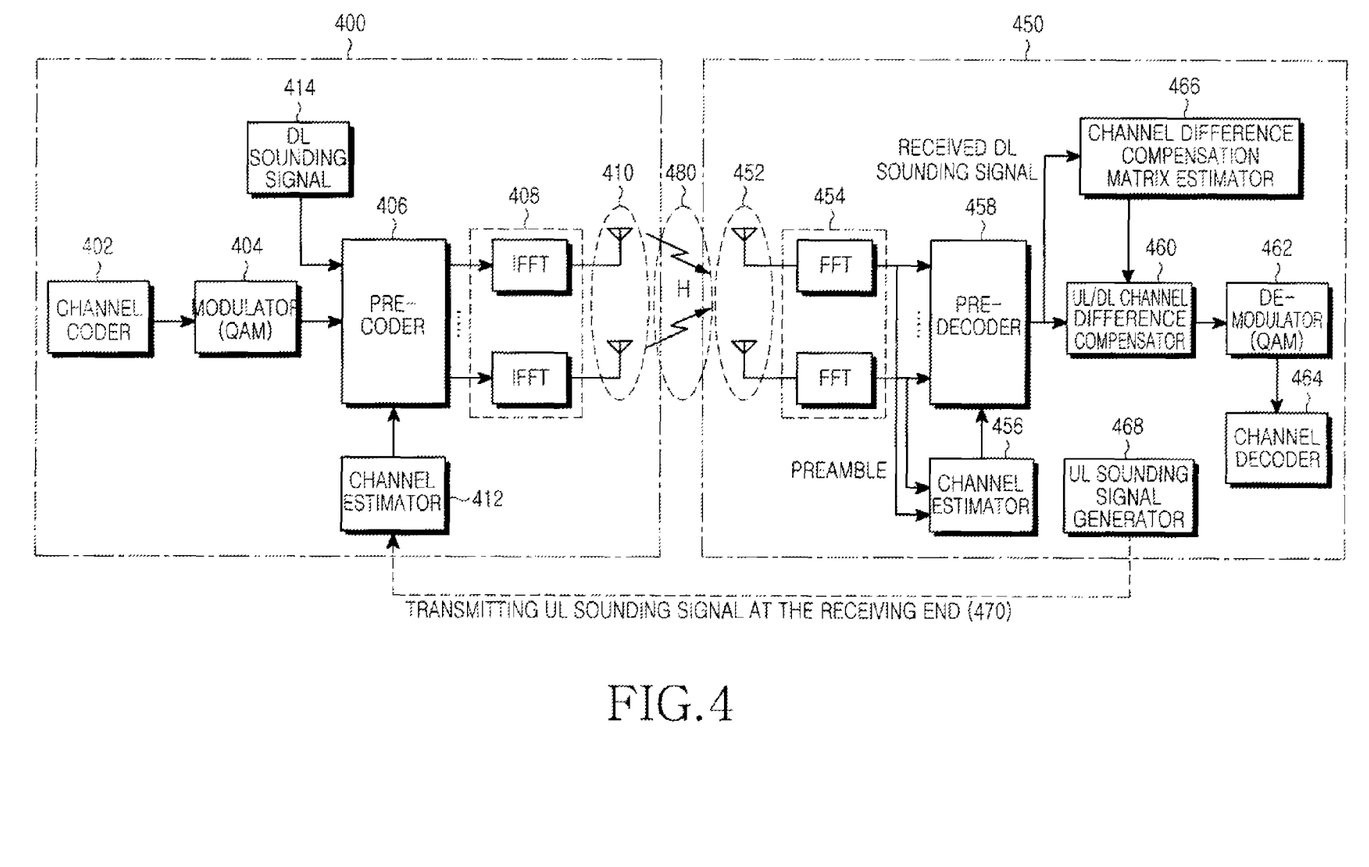
FIG. 4 shows a block diagram of a DL Sounding-based SVD pre-coding system in the TDD mode according to an exemplary embodiment of the present invention.

FIG. 4 shows a block diagram of a DL Sounding-based SVD pre-coding system in the TDD mode according to an exemplary embodiment of the present invention.

Referring to FIG. 4, the system comprises a transmitting end 400, a receiving end 450, and MIMO channels 480. The transmitting end 400 comprises primarily a channel coder 402, a modulator 404, a pre-coder 406, an Inverse Fast Fourier Transform (IFFT) unit 408, a multi-antenna transmitter 410 and a channel estimator 412.

The receiving end 450 comprises primarily a multi-antenna receiver 452, a Fast Fourier Transform (FFT) unit 454, a channel estimator 456, a pre-decoder 458, an uplink/downlink channel difference compensator 460, a demodulator 462 and a channel decoder 464. Detailed description of the structures and functions of any well-known devices is omitted.

The transmitting end 400 first encodes information bits with the channel coder 402. The coded data are then subjected to baseband modulation by the modulator 404. After a DL Sounding signal is added to the data, the pre-coder 406 multiplies the result with a pre-coding matrix V (also known as a transmitting matrix) to obtain data symbols to be transmitted. The data symbols are allocated to, for example, Orthogonal Frequency Division Multiplexing (OFDM) sub-carriers and sent out. Here, the pre-coder 406 adopts SVD. The transmitting end 400 uses a UL Sounding signal 470 which is generated and transmitted in UL sounding signal generator 468 to estimate an uplink channel matrix $H^T$, and obtains a downlink channel matrix H from the estimated uplink channel matrix $H^T$ according to the channel reciprocal theory of the TDD system. The pre-coder 406 performs SVD on the downlink channel matrix H to obtain the pre-coding matrix V. Subsequently, the pre-coder 406 multiplies the pre-coding matrix V obtained from SVD with the data added with the DL Sounding signal 414 for transmission. Finally, the transmitting end 400 inserts a preamble and transmits it along with data symbols in a frame form.

The data symbols arrive at the receiving end 450 via the MIMO channels 480. The receiving end 450 first transforms the received data symbols with the FFT unit 454. Then, the receiving end 450 uses the preamble in the frame structure of the data symbols to estimate the downlink channel matrix H. Subsequently, the receiving end 450 decomposes, with the pre-decoder 458, a pre-decoding matrix U* (also known as a receiving matrix), and uses the pre-decoding matrix U* to perform pre-decoding. The receiving end 450 can also adopt SVD correspondingly to the decomposition method at the transmitting end 400.

The uplink/downlink channel difference compensator 460 performs on the pre-decoded data a compensation for the difference between uplink and downlink channels. Details of the compensation will be described later. The uplink/downlink channel difference compensator 460 first uses a DL Sounding signal 414 obtained from the pre-decoding to estimate an inverse matrix U*HV (i.e. the uplink/downlink channel difference compensation matrix, details of calculation of the matrix will be described later). The uplink/downlink channel difference compensator 460 then uses this matrix to perform difference compensation on the pre-decoded data.

The receiving end 450 may include a channel difference compensation matrix estimator 466 for estimating the uplink/downlink channel difference compensation matrix. In this case, the uplink/downlink channel difference compensator 460 is not required to estimate the compensation matrix. Instead, the channel difference compensation matrix estimator 466 uses the DL Sounding signal 414 added to the received data symbols to estimate the inverse matrix U*HV, and provides the DL Sounding signal 414 to the uplink/downlink channel difference compensator 460 to compensate for the difference between uplink and downlink channels. Preferably, the channel difference compensation matrix estimator 466 can be implemented as part of the uplink/downlink channel difference compensator 460. Finally, the receiving end 450 maps the data symbols into a bit stream with the demodulator 462, decodes and corrects errors in the bit data with the channel decoder 464, and outputs the information bits.

Figure 5:
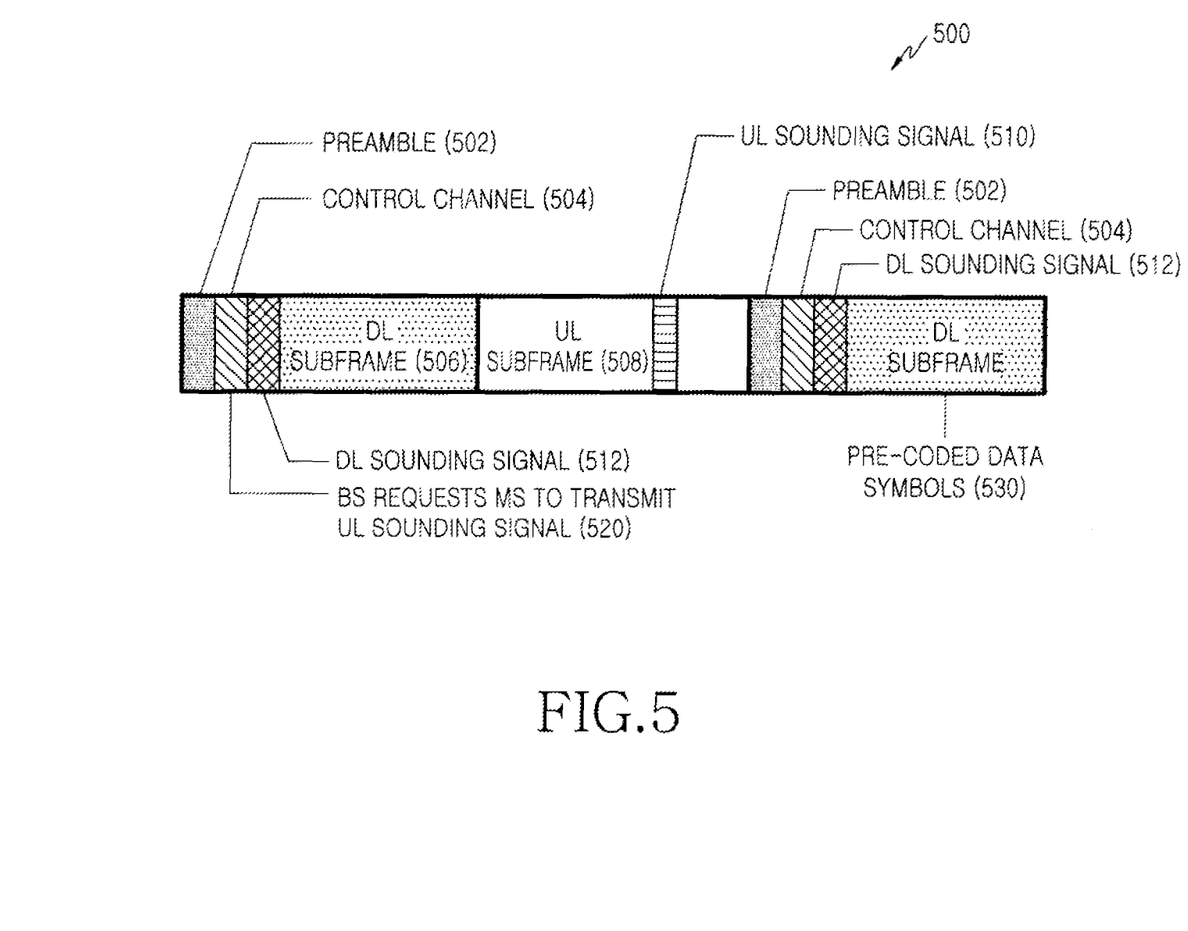
FIG. 5 shows a frame structure for data symbols in the system according to an exemplary embodiment of the present invention.

FIG. 5 shows a frame structure 500 for the data symbols in the system according to an exemplary embodiment of the present invention.

Referring to FIG. 5, the frame structure 500 of the system comprises 6 parts: control channel sub-frame 504, preamble 502, downlink sub-frame 506, uplink sub-frame 508, UL Sounding signal 510, and DL Sounding signal 512. In the present invention, the transmitting end (such as base station) can notify the receiving end, via the control channel sub-frame 504, to send the UL Sounding signal 510 for estimating the downlink channel matrix H (step 520). The transmitting end need not make the above notification. Instead, the transmitting end can estimate the downlink channel matrix H periodically as in the conventional methods or estimate based on predetermined settings. According to an exemplary embodiment of the present invention, with the notification in advance, the transmitting end can further ensure a real-time estimation at the transmitting end and improve channel estimation accuracy and pre-coding performance.

After receiving the UL Sounding signal 510, the transmitting end obtains the pre-coding matrix V through SVD and uses the pre-coding matrix V to transmit the data symbols. In addition, the transmitting end can also notify the receiving end, via the control channel sub-frame 504, to prepare to receive the pre-coding, and inform the receiving end that the data symbols transmitted includes the DL Sounding signal 512 to compensate for the difference between uplink and downlink channels. As shown in FIG. 5, the DL Sounding signal 512 may be transmitted during an interval after the transmission of the control channel 504 and before the transmission of the downlink sub-frame 506.

After receiving the control channel sub-frame 504, the receiving end transmits the UL Sounding signal 510 via the uplink sub-frame 508. Then, the transmitting end starts to transmit the preamble 502, the DL Sounding signal 512, and the downlink sub-frame 506. After receiving the data, the receiving end uses the preamble 502 to estimate downlink CSI, the particular operations of which include estimating the downlink channel matrix H and calculating the pre-decoding matrix U* through SVD. In addition, the DL Sounding signal 512 is used to compensate for the difference between uplink and downlink channels.

Below, the UL Sounding signal and the DL Sounding signal are described in detail.

The UL Sounding signal mainly has the following functions. In the TDD system, the receiving end sends some known data symbols to the transmitting end through the UL Sounding signal. These data symbols are used by the transmitting end to estimate the channel matrix $H^T$ of the uplink channel. The transmitting end can thus determine a response of downlink channels from the transmitting end to the receiving end, according to the reciprocal characteristic of uplink and downlink channels in the TDD mode. In the traditional solutions, the transmitting end receives the UL Sounding signal and uses the UL Sounding signal to determine the state information of the downlink channels from the transmitting end to the receiving end, thereby utilizing the reciprocal characteristic of uplink and downlink channels to transmit data symbols (specifically including estimating the channel matrix $H^T$ of uplink channel to obtain the channel matrix H of downlink channel, obtaining the pre-coding matrix V through SVD, multiplying the data symbols to be transmitted with the pre-coding matrix V for pre-coding, and transmitting).

The receiving end performs interpolation according to the pilot inserted by the transmitting end into the data symbols, to obtain the channel matrix H. As described above, due to the uplink/downlink channel difference caused by, for example, asymmetrical services and delays, the channels estimated by the traditional solutions are not accurate enough, which may lower the pre-coding technology performance. In the IEEE 802.16e Protocol, there are two schemes to transmit the UL Sounding signal. One is a discrete type scheme, namely discretely inserting the UL Sounding signal into the allocated frequency band. With this scheme, the transmitting end judges channel quality based on the UL Sounding signal transmitted by the receiving end, and chooses those sub-carriers with the best channel quality to transmit data symbols. The other scheme is that the UL Sounding signal sent by the receiving end occupies all the sub-carriers in the allocated frequency band. According to an exemplary embodiment of the present invention, the UL Sounding signal is mainly used for channel estimation to support SVD-based pre-coding technology. Therefore, according to an exemplary embodiment of the present invention, the transmitting end transmits a control signaling to inform the receiving end that pre-coding will be performed, and requests the receiving end to transmit an UL Sounding signal which shall occupy all the sub-carriers in the allocated frequency band.

According to an exemplary embodiment of the present invention, the DL Sounding signal mainly has the following functions. The transmitting end transmits some known data symbols to the receiving end through the DL Sounding signal. These data symbols are used to compensate for the difference between uplink and downlink channels. As described above, in the traditional solutions, the transmitting end does not transmit the DL Sounding signal, and the receiving end performs interpolation only based on the pilot inserted into the data symbols by the transmitting end, and obtains the channel matrix H. The channel estimation in the traditional solutions is not accurate, and there is no measure for compensating for the difference between uplink and downlink channels. According to an exemplary embodiment of the present invention, however, the transmitting end adds the DL Sounding signal into the modulated data symbols, and then multiplies them with the pre-coding matrix V obtained through SVD for transmission. After receiving the data, the receiving end uses the preamble to estimate the downlink CSI, and uses the received DL Sounding signal to compensate for the difference between uplink and downlink channels. This improves the pre-coding/decoding performance of the system.

Figure 6:
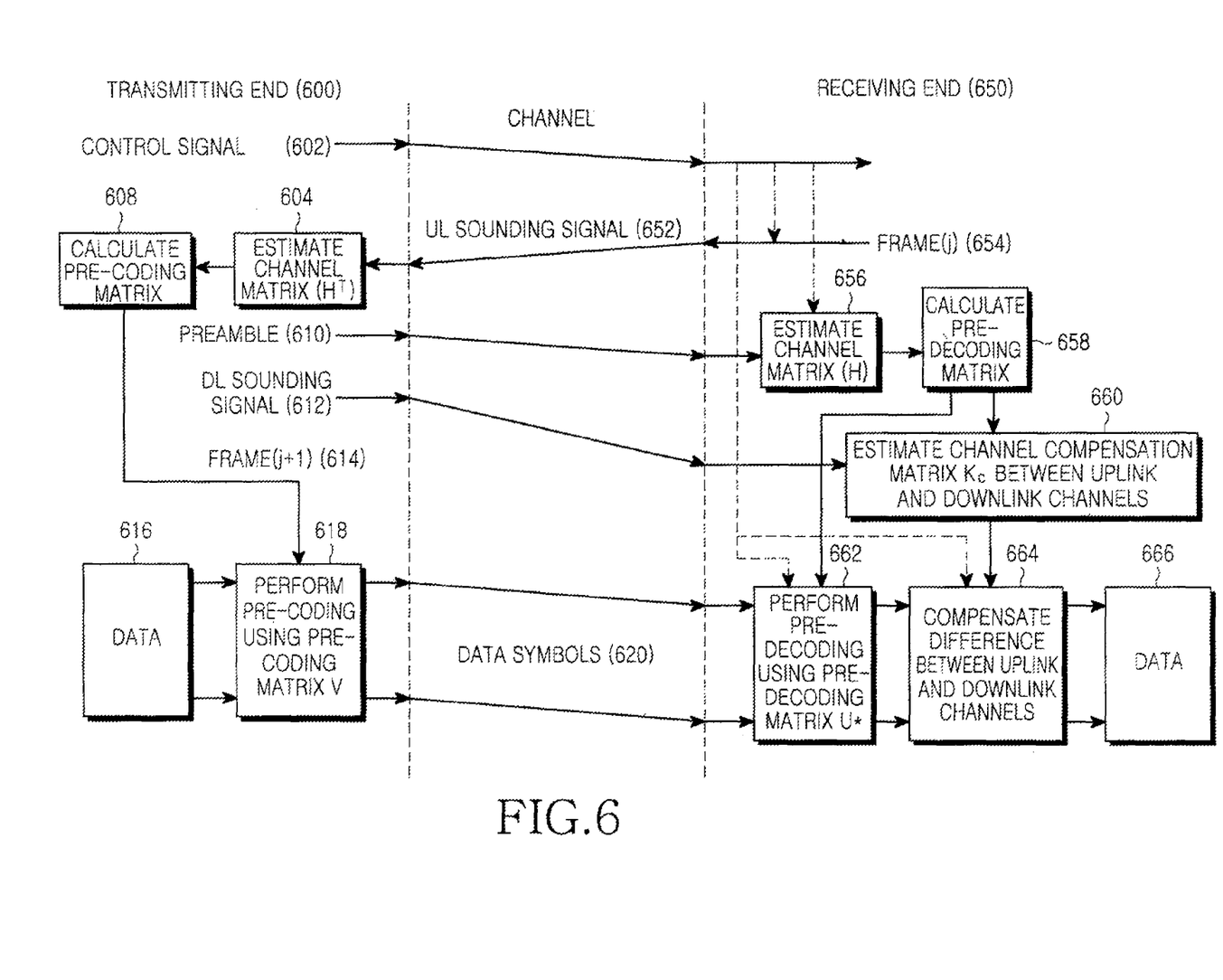
FIG. 6 is a schematic diagram of a DL Sounding-based SVD pre-coding method according to an exemplary embodiment of the present invention.

FIG. 6 is a schematic diagram of the process of an SVD pre-coding method introduced with the DL Sounding signal according to an exemplary embodiment of the present invention.

Referring to FIG. 6, a transmitting end 600 first transmits a control signaling 602 to a receiving end 650 and requests the receiving end 650 to send a UL Sounding signal 652 on all sub-carriers in the allocated frequency band in the jth frame Frame (j) 654. The transmitting end also notifies the receiving end 650 to use a preamble 610 in the (j+1)th frame Frame (j+1) 614 to estimate the channel matrix H for SVD. In addition, the transmitting end 600 can also notify the receiving end 650 that a DL Sounding signal 612 will be included in Frame (j+1) 614 to compensate for the difference between uplink and downlink channels. As mentioned above, the transmitting end 600 can also carry out estimation according to the traditional solutions, rather than sending such notification to the receiving end 650 in advance. According to an exemplary embodiment of the present invention, this notification step is preferably added so as to ensure real time for the receiving end 650 sending the UL Sounding signal 652 and the transmitting end 600 estimating channel state, and thus further improve the system performance.

After receiving the control signaling 602, the receiving end 650 transmits the UL Sounding signal on all sub-carriers in the allocated frequency band in Frame (j) 654. After receiving the UL Sounding signal 652, the transmitting end 600 estimates the uplink channel matrix $H^T$ in step 604 and derives the downlink channel matrix H in accordance with the reciprocal characteristic of uplink and downlink channels in the TDD system. Based on the channel matrix H, the transmitting end 600 calculates the pre-coding matrix V in step 608. Then, the transmitting end 600 adds a DL Sounding signal 612 to data symbols 616 in Frame (j+1) 614 and performs pre-coding using the pre-coding matrix V in step 618, while inserting a preamble 610 into Frame (j+1) 614. Finally, the data symbols 620 are matched onto, for example, OFDM sub-carriers for transmission.

After receiving the Frame (j+1) 614, the receiving end 650 performs OFDM demodulation through FFT. The receiving end 650 then uses the preamble 610 in the Frame (j+1) 614 to estimate the channel matrix H for calculating the matrix U* (i.e. the pre-decoding matrix of the receiving end) in SVD in step 656. Then, the receiving end 650 calculates the pre-decoding matrix U* in step 658 and uses the calculated pre-decoding matrix U* to pre-decode the data symbols 620 in the Frame (j+1) 614.

The receiving end 650 obtains the DL Sounding signal 612 and uses the DL Sounding signal 612 to estimate the channel compensation matrix $K_C$ to compensate for the difference between the uplink and downlink channels in step 660. In the above example, the UL Sounding signal 652 in the Frame (j) 654 and the preamble in the Frame (j+1) 614 are used to estimate the channel matrix H in step 656 and obtain the pre-coding matrix V and the pre-decoding matrix U* in step 658. Because the two frames are immediately consecutive and thus the communication time interval is very small, the estimated channel state is more accurate, compared with the estimated one in the case of two frames with a large communication time interval. Further, the DL Sounding signal 612 in the Frame (j+1) 614 is used in step 660 to compensate for the difference between uplink and downlink channels. The receiving end 650 uses the pre-decoding matrix U* to decode the data symbols 620 received from the transmitting end 600 in step 662. The receiving end 650 uses the estimated channel compensation matrix $K_C$ to more accurately compensate for the difference between the uplink and downlink channels in step 664 and to generate data in step 666.

Because of the small communication time interval between the UL Sounding signal 652 in the Frame (j) 654 and the preamble and DL Sounding signal 612 in the Frame (j+1) 614, the use of the DL Sounding signal 612 can give more accurate difference compensation between the uplink and downlink channels.

Below, a specific example is given for the uplink/downlink difference compensation by the receiving end. Consider an MIMO system with flat fading channels, and let x be a vector of transmitted data symbols, $V_{UL}$ be a SVD pre-coding matrix of the uplink channel matrix $H_{UL}$ ($H_{UL}=U_{UL}\Sigma_{UL}V_{UL}^*$), $H_{DL}$ be the downlink channel matrix, and $n_{AWGN}$ be a vector of additive white Gaussian noise of channels. In this case, the vector y of the received data symbols can be represented as:

$$y = H_{DL}V_{UL}x + n_{AWGN} \quad (4)$$

The receiving end performs SVD on the estimated downlink channel matrix $H_{DL}$, which is expressed as:

$$H_{DL}U_{DL}\Sigma_{DL}V_{DL}^* \quad (5)$$

After processing the vector y of the received data symbols with the SVD pre-decoding matrix U*, the estimated compensation matrix $K_C$ is used in channel difference compensation for the received signals. The compensated signal vector x is expressed as:

$$\tilde{x} = K_C U_{DL}^*(H_{DL}V_{UL}x + n_{AWGN}) \quad (6)$$
$$= K_C U_{DL}^* H_{DL} V_{UL} x + K_C U_{DL}^* n_{AWGN}$$

Because the compensation matrix $K_C$ is estimated with the DL Sounding signal, and the receiving end knows the DL Sounding signal, $\tilde{x}=x$ can hold to obtain the channel difference compensation matrix $K_C$:

$$K_C = [(U_{DL}^*(H_{DL}V_{UL}x + n_{AWGN}))^H U_{DL}^*(H_{DL}V_{UL}x + n_{AWGN})]^{-1} \quad (7)$$
$$(U_{DL}^*(H_{DL}V_{UL}x + n_{AWGN}))^H x$$

The superscript H represents conjugate transpose operation.

According to the Zero-Forcing algorithm, the channel difference compensation matrix $K_C$ can be re-written as $$K_C = [(U_{DL}^* H_{DL}V_{UL})^H B U_{DL}^* H_{DL}V_{UL}]^{-1}$$
$$(U_{DL}^* H_{DL}V_{UL})^H B \quad (8)$$

B is any matrix which satisfies $$\mathrm{rank}(U_{DL}^* H_{DL}V_{UL}) =$$
$$\mathrm{rank}[(U_{DL}^* H_{DL}V_{UL})^H B U_{DL}^* H_{DL}V_{UL}] \quad (9)$$

According to the detection algorithm Minimal Mean Square Error (MMSE), the channel difference compensation matrix $K_C$ is obtained as:

$$K_C = E\{xx^*\}(U_{DL}^* H_{DL}V_{UL})^H [I +$$
$$(U_{DL}^* H_{DL}V_{UL})^H E\{xx^*\} U_{DL}^* H_{DL}V_{UL}]^{-1} \quad (10)$$

where I represents a unit matrix, and E{ } represents an averaging operation.

Specific exemplary embodiments of the present invention have been described above. The invention can be used in, but is not limited to, IEEE 802.16e systems. For example, in IEEE 802.16e systems employing the TDD mode, when data will be transmitted to user(s) (such as Mobile Station(s) MS(s)) over the same channel for a long period of time, and the channel response of the downlink (Base Station (BS)→MS) has to be learned in real time, the feedback scheme is generally not expected to be used for obtaining CSI. This is because this scheme will occupy too many resources and result in a large overhead. To obtain an estimated channel matrix with comparative accuracy, the commonly used scheme is to transmit a UL Sounding signal by the MS and to estimate the channel matrix H by the BS based on the UL Sounding signal. This scheme can estimate the channel matrix H in a more accurate way than those using pilot or preamble, and thus can improve the system performance and reduce system complexity with less overhead. According to an exemplary embodiment of the present invention, the system can expect that using the UL Sounding signal to estimate downlink channels will bring about errors, and BS can transmit the DL Sounding signal for channel compensation at the MS side regarding the errors, thus further improving the system performance.

According to an exemplary embodiment of the present invention, the DL Sounding signal refers to a signal transmitted from a base station to a mobile station to obtain information about downlink. The DL Sounding signal may be called a reference signal according to standardization organizations, enterprises, developers, etc., and includes information that the mobile terminal can use to measure a downlink channel state. For example, the DL sounding signal may include at least one of channel quality information, a pre-coding matrix index, and a rank index.

The SVD pre-coding/pre-decoding method using DL Sounding signal according to an exemplary embodiment of the present invention is especially applicable to asymmetrical channel environments in the TDD mode. By introducing the DL Sounding signal into pre-coding/pre-decoding processing and using the UL Sounding signal, the DL Sounding signal and the preamble to estimate and compensate uplink/downlink channel responses, it is possible to reduce influence of asymmetrical channel environment on the system performance. Exemplary embodiments of the present invention can give the following technical effects:

(1) using SVD in pre-coding is better than using a codebook in terms of channel suppression; it is simple and can reduce complexity at the receiving end;

(2) by using the DL Sounding signal, the problem of uplink/downlink channel difference in the TDD system can be well addressed, and it enables difference compensation and is helpful to improve the system performance;

(3) using the UL Sounding signal can avoid the disadvantage of the TDD system that the feedback channel in the feedback closed loop occupies many air interface resources;

(4) using the UL Sounding signal occupying all the subcarriers in the allocated frequency band to estimate channels can result in more accurate channel estimates than using the pilot, thereby improving the pre-coding performance;

(5) relevant notifications are sent to the receiving end in advance, the UL Sounding in Frame (j) and the preamble in Frame (j+1) are used to estimate the channel matrix, and the pre-coding matrix V and U* is obtained at the same time; because the time interval between transmission of the two signals is relatively small, the estimated channel response is more accurate. In addition, the DL Sounding signal in Frame (j+1) is used to compensate for the difference between uplink and downlink channels, which further improves the channel response accuracy and system performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A pre-coding method for data transmission through Time Division Duplexing (TDD) in a mobile communication system, the method comprising:
    estimating downlink channel state information based on an uplink sounding signal; and
    pre-coding a data symbol and a downlink sounding signal based on the estimated downlink channel state information,
    wherein the downlink sounding signal is used to compensate for a difference between an uplink channel value and a downlink channel value.

2. The method of claim 1, wherein the downlink sounding signal includes at least one of channel quality information, a pre-coding matrix index, and a rank index.

3. The method of claim 1, wherein the downlink sounding signal is transmitted during an interval after a control channel signal is transmitted and before a downlink sub-frame is transmitted.

4. The method of claim 1, wherein the estimating of the downlink channel state information comprises estimating a downlink channel matrix (H) based on the uplink sounding signal.

5. The method of claim 4, wherein the estimating of the downlink channel matrix (H) includes:
    estimating an uplink channel matrix ($H^T$) based on the uplink sounding signal; and
    estimating the downlink channel matrix (H) from the estimated uplink channel matrix ($H^T$) according to a reciprocal theory of channels of a TDD system.

6. The method of claim 4, wherein the pre-coding of the data symbol and the downlink sounding signal includes:
    generating a pre-coding matrix (V) using singular value decomposition (SVD) on the downlink channel matrix (H); and
    pre-coding the data symbol and the downlink sounding signal using the pre-coding matrix (V).

7. A pre-decoding method for data reception through Time Division Duplexing (TDD) in a mobile communication system, the method comprising:
    transmitting an uplink sounding signal on a specific frame;
    pre-decoding a data symbol included in a next frame of the specific frame; and
    compensating for a difference between an uplink channel value and a downlink channel value on the pre-decoded data symbol based on a downlink sounding signal included in the next frame,
    wherein the downlink sounding signal is used to compensate for the difference between the uplink channel value and the downlink channel value.

8. The method of claim 7, wherein the downlink sounding signal includes at least one of channel quality information, a pre-coding matrix index, and a rank index.

9. The method of claim 7, wherein the downlink sounding signal is transmitted at an interval after a control channel signal is transmitted and before a downlink sub-frame is transmitted.

10. The method of claim 7, wherein the pre-decoding of the data symbol includes:
    estimating a downlink channel matrix (H) based on a preamble included in the next frame;
    generating a pre-decoding matrix (U*) based on Singular Value Decomposition (SVD) on the estimated downlink channel matrix (H); and
    pre-decoding the data symbol based on the pre-decoding matrix (U*).

11. The method of claim 7, wherein the compensating for the difference between the uplink channel value and the downlink channel value includes:
    estimating a compensation matrix ($K_C$) for the difference between the uplink channel value and the downlink channel value based on the downlink sounding signal; and
    performing on the pre-decoded data symbol a compensation for the difference between the uplink channel value and the downlink channel value by using the compensation matrix ($K_C$).

12. The method of claim 11, wherein the compensation matrix ($K_C$) is calculated as:

$$K_C = E\{xx^*\}(U_{DL}{}^* H_{DL} V_{UL})^H [I + (U_{DL}{}^* H_{DL} V_{UL})^H E\{xx^*\} U_{DL}{}^* H_{DL} V_{UL}]^{-1}$$

where x represents a vector of the data symbols transmitted by a transmitting end, x* represents the conjugate of the vector x, $H_{DL}$ represents a downlink channel matrix, $U_{DL}{}^*$ represents the pre-decoding matrix, $V_{UL}$ represents the pre-coding matrix, I represents a unit matrix, E { } represents an averaging operation, and H represents a conjugate transpose.

13. The method of claim 12, wherein the compensation matrix ($K_C$) is performed on the pre-decoded data symbol according to the following equation:

$$\tilde{x} = K_C U_{DL}^* (H_{DL} V_{UL} x + n_{AWGN})$$
$$= K_C U_{DL}^* H_{DL} V_{UL} x + K_C U_{DL}^* n_{AWGN}$$

where $\tilde{x}$ represents a compensated vector of the data symbol, and $n_{AWGN}$ represents a vector of additive white Gaussian noise of a transmission channel.

14. A pre-coding apparatus for data transmission through Time Division Duplexing (TDD) in a mobile communication system, the apparatus comprising:
    a channel estimator for estimating downlink channel state information based on an uplink sounding signal; and
    a pre-coder for pre-coding a data symbol and a downlink sounding signal based on the estimated downlink channel state information,
    wherein the downlink sounding signal is used to compensate for a difference between an uplink channel value and a downlink channel value.

15. The pre-coding apparatus of claim 14, wherein the downlink sounding signal includes at least one of channel quality information, a pre-coding matrix index, and a rank index.

16. The pre-coding apparatus of claim 14, wherein the downlink sounding signal is transmitted at an interval after a control channel signal is transmitted and before a downlink sub-frame is transmitted.

17. The pre-coding apparatus of claim 14, wherein the channel estimator estimates a downlink channel matrix (H) based on the uplink sounding signal.

18. The pre-coding apparatus of claim 17, wherein the channel estimator estimates an uplink channel matrix ($H^T$) based on the uplink sounding signal, and estimates the downlink channel matrix (H) from the estimated uplink channel matrix ($H^T$) according to a reciprocal theory of channels of a TDD system.

19. The pre-coding apparatus of claim 14, wherein the pre-coder generates a pre-coding matrix (V) based on Singular Value Decomposition (SVD) on the downlink channel matrix (H), and pre-codes the data symbol and the downlink sounding signal using the pre-coding matrix (V).

20. A pre-decoding apparatus for data reception through Time Division Duplexing (TDD) in a mobile communication system, the apparatus comprising:
a transmitter for transmitting an uplink sounding signal on a specific frame;
a pre-decoder for pre-decoding a data symbol included in a next frame of the specific frame; and
an uplink/downlink channel difference compensator for compensating for a difference between an uplink channel value and a downlink channel value on the pre-decoded data symbol based on a downlink sounding signal included in the next frame, wherein the downlink sounding signal is used to compensate for the difference between the uplink channel value and the downlink channel value.

21. The pre-decoding apparatus of claim 20, wherein the downlink sounding signal includes at least one of channel quality information, a pre-coding matrix index, and a rank index.

22. The pre-decoding apparatus of claim 20, wherein the downlink sounding signal is transmitted during an interval after a control channel signal is transmitted and before a downlink sub-frame is transmitted.

23. The pre-decoding apparatus of claim 20, further comprising a channel estimator for estimating a downlink channel matrix (H) based on a preamble included in the next frame.

24. The pre-decoding apparatus of claim 23, wherein the pre-decoder generates a pre-decoding matrix (U*) based on Singular Value Decomposition (SVD) on the estimated downlink channel matrix (H), and pre-decodes the data symbol using the pre-decoding matrix (U*).

25. The pre-decoding apparatus of claim 20, wherein the uplink/downlink channel difference compensator estimates a compensation matrix ($K_C$) for the difference between the uplink channel value and the downlink channel value using the downlink sounding signal, and performs on the pre-decoded data symbol a compensation for the difference between the uplink channel value and the downlink channel value by using the compensation matrix ($K_C$).

26. The pre-decoding apparatus of claim 25, wherein the compensation matrix ($K_C$) is calculated as:

$$K_C = E\{xx^*\}(U_{DL}^* H_{DL} V_{UL})^H [I + (U_{DL}^* H_{DL} V_{UL})^H E\{xx^*\} U_{DL}^* H_{DL} V_{UL}]^{-1}$$

where x represents a vector of the data symbols transmitted by a transmitting end, x* represents the conjugate of the vector x, $H_{DL}$ represents a downlink channel matrix, $U_{DL}^*$ represents the pre-decoding matrix, $V_{UL}$ represents the pre-coding matrix, I represents a unit matrix, E { } represents an averaging operation, and H represents a conjugate transpose.

27. The pre-decoding apparatus of claim 26, wherein the compensation matrix ($K_C$) is performed on the pre-decoded data symbol according to the following equation:

$$\tilde{x} = K_C U_{DL}^* (H_{DL} V_{UL} x + n_{AWGN})$$
$$= K_C U_{DL}^* H_{DL} V_{UL} x + K_C U_{DL}^* n_{AWGN}$$

where $\tilde{x}$ represents a compensated vector of the data symbol, and $n_{AWGN}$ represents a vector of additive white Gaussian noise of a transmission channel.

28. A mobile communication system, comprising:
a transmitting end for estimating downlink channel state information based on an uplink sounding signal, for pre-coding a data symbol and a downlink sounding signal based on the estimated downlink channel state information, and for transmitting the pre-coded data symbol and downlink sounding signal; and
a receiving end for transmitting the uplink sounding signal to the transmitting end, for pre-decoding the data symbol, for receiving the pre-coded data symbol and downlink sounding signal transmitted from the transmitting end, and for compensating for a difference between an uplink channel value and a downlink channel value on the pre-decoded data symbol based on the downlink sounding signal.

29. The mobile communication system of claim 28, wherein the transmitting end notifies the receiving end of the transmission of the downlink sounding signal.

* * * * *